United States Patent [19]

Baines

[11] Patent Number: 5,258,784
[45] Date of Patent: Nov. 2, 1993

[54] SPECTACLE FRAME

[76] Inventor: Ian J. Baines, 55 Cedar La., Oxford, Conn. 06483

[21] Appl. No.: 731,630

[22] Filed: Jul. 17, 1991

[51] Int. Cl.$^5$ .............................................. G02C 1/00
[52] U.S. Cl. .................... 351/41; 351/119; 351/121; 351/124; 351/153
[58] Field of Search ...................... 351/41, 47, 49, 153, 351/114, 119, 121, 140, 118, 124, 125, 133; 16/288

[56] References Cited

U.S. PATENT DOCUMENTS

| D. 51,654 | 1/1918 | Poeton . | |
|---|---|---|---|
| D. 308,531 | 6/1990 | Barrat . | |
| 576,330 | 2/1897 | Stone . | |
| 1,496,560 | 6/1923 | Spyer . | |
| 1,936,319 | 11/1933 | Wingate . | |
| 3,052,160 | 9/1962 | Ratti . | |
| 3,084,595 | 4/1963 | Watts et al. . | |
| 3,542,460 | 11/1970 | Smith et al. | 351/52 |
| 3,639,044 | 2/1972 | Blair | 351/103 |
| 3,756,704 | 9/1973 | Marks | 351/60 |
| 3,796,482 | 3/1974 | Blumenthal | 351/114 |
| 3,944,344 | 3/1976 | Wichers | 351/41 |
| 4,037,946 | 7/1977 | Blumenthal | 351/114 |
| 4,153,347 | 5/1979 | Myer | 351/90 |
| 4,360,252 | 11/1982 | Solomon | 351/95 |
| 4,618,226 | 10/1986 | Sartor et al. | 351/113 |
| 4,781,450 | 11/1988 | Danloup et al. | 351/114 |
| 4,904,075 | 2/1990 | Blumenthal | 351/114 |

FOREIGN PATENT DOCUMENTS

| 798331 | 5/1936 | France | 351/114 |
|---|---|---|---|
| 60-221725 | 11/1985 | Japan | 351/153 |
| 62-153931 | 7/1987 | Japan | 351/153 |
| 2178186A | 2/1987 | United Kingdom | 351/114 |

Primary Examiner—Bruce Y. Arnold
Assistant Examiner—Hung X. Dang

[57] ABSTRACT

A spectacle frame includes a nose bar, a pair of eyewires each having one side connected to the ends of the nose bar and end pieces on their other side and a pair of temples pivotally connected to the end pieces of the eyewires. The nose bar and/or the pair of temples include at least three links having interengaged end portions. These links are fixedly connected, although some limited articulation may be provided. The spectacle frame desirably includes a unique hinge assembly for the temples and may also include inserts bonded to the eyewires to permit mechanical engagement with the nose bar. The spectacle frame may also include a brow bar which is threadably captured in bosses on the eyewires.

13 Claims, 6 Drawing Sheets

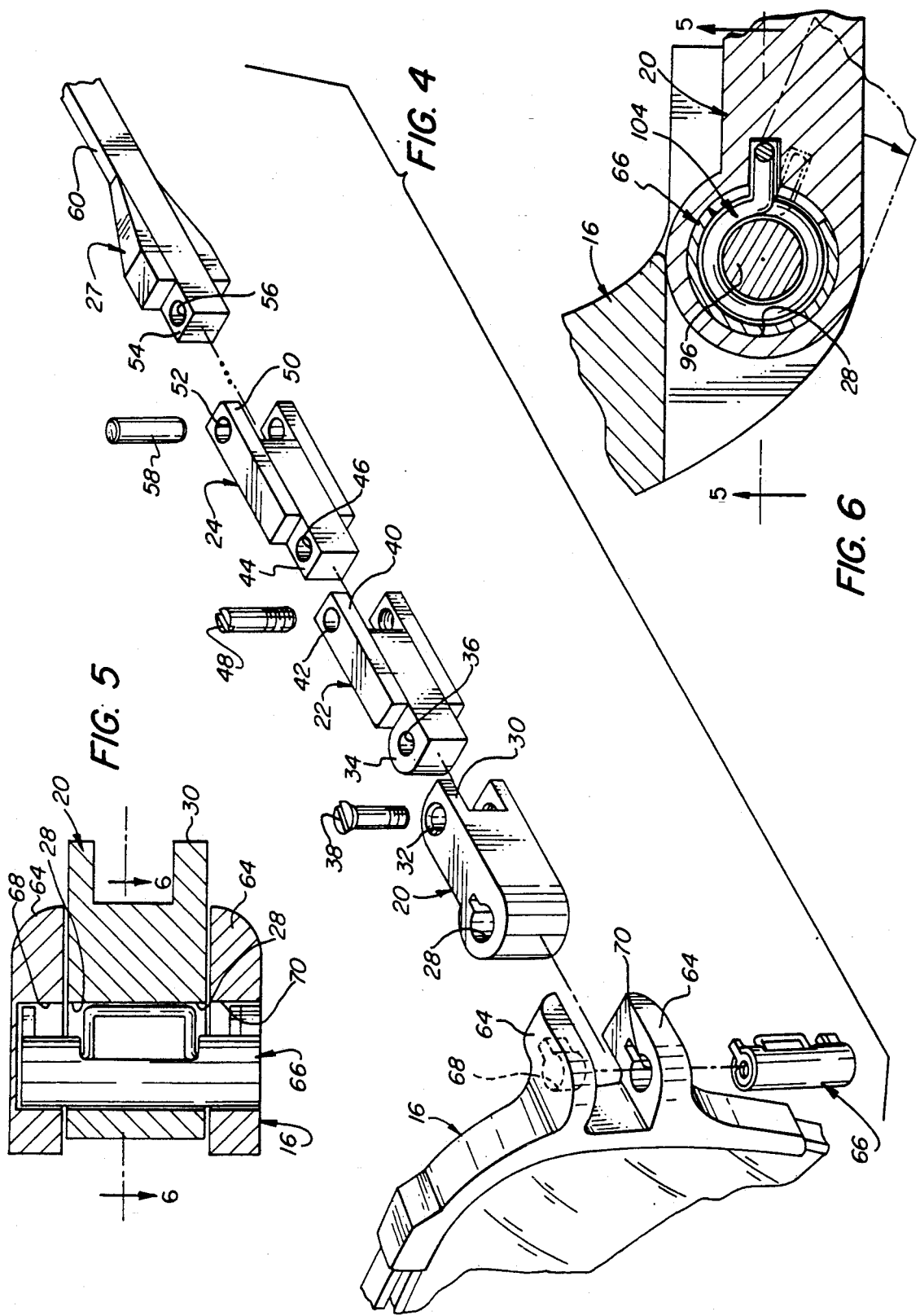

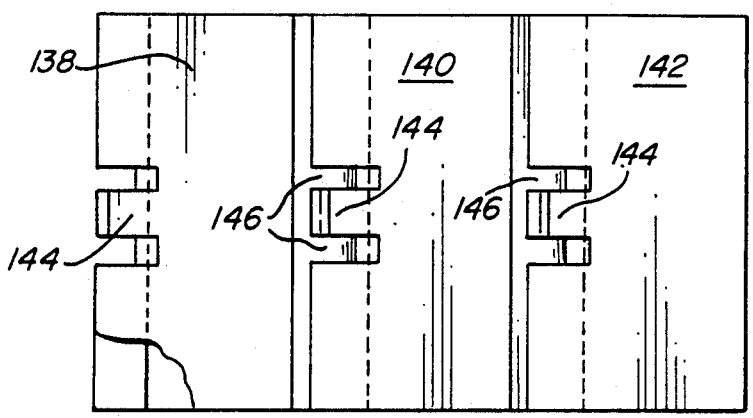
FIG. 13
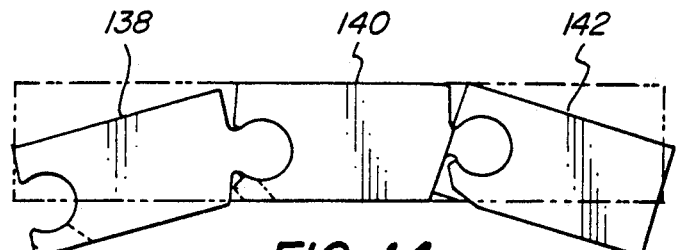
FIG. 14
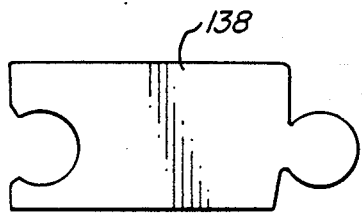
FIG. 14A
FIG. 14B
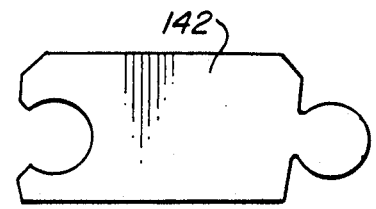
FIG. 14C
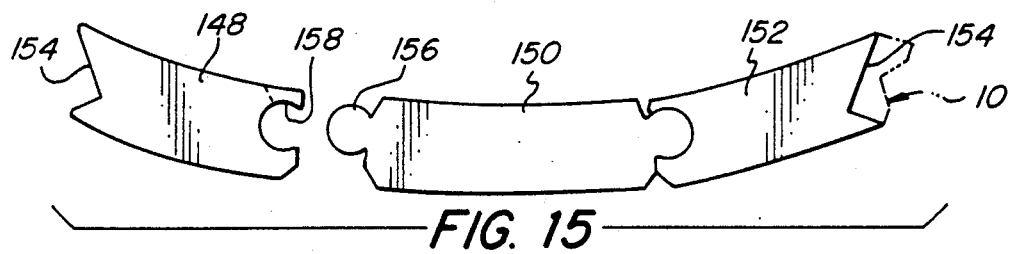
FIG. 15
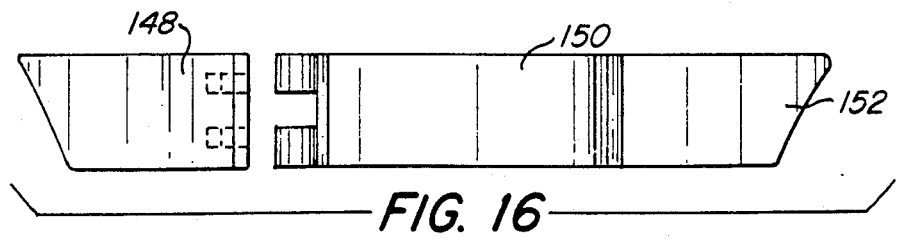
FIG. 16

SPECTACLE FRAME

BACKGROUND OF THE INVENTION

The present invention relates to spectacle frames, and, more particularly, to novel constructions for the components of such frames and for assembling such components.

As is well known, spectacle frames generally comprise a pair of eyewires or other elements for retaining the lenses, a nose piece extending therebetween to support the lenses upon the nose, and a pair of temples which extend about the ear to orient and support the frame on the head. Some spectacle frames additionally employ a brow bar extending between the upper ends of the eyewires.

Generally, the eyewires in metal frames are formed from wire stock with a groove to receive the edge of the lens and they are formed about the lens and are usually joined together by a coined or stamped bridge bar, nose bar or brow bar. The temples which hold the spectacles upon the head by hooking over the ears may be formed from stamped metal stock or wire stock, and they are joined to the front of the spectacles by means of a tenon which may be either a bent piece of stamped and/or coined alloy or by a milled profile which is known as a monoblock.

As is well known, certain metallic alloys are preferable for elements of the assembly in order to provide optimum shape retaining and/or tensioning properties while others are preferred for the ease of forming them. However, it is frequently difficult to effect joinder of dissimilar metals utilized for the components.

A great deal of effort is devoted by manufacturers of frames to develop designs which will be novel and appealing. As a result, many frame designs present a striking appearance while employing construction features which detract from long life or utility of the frame, or which are expensive.

It is an object of the present invention to provide a novel spectacle frame construction capable of substantial variation in the appearance while enabling facile assembly of the components.

It is also an object to provide such a spectacle frame in which the components may be readily and relatively economically fabricated, relatively easily assembled to accommodate variations in size.

Another object is to provide such a spectacle frame in which dissimilar metals may be employed for various components and joined together in a secure fashion.

Still another object is to provide such a spectacle frame employing a desirable spring action in the connection between the temple and the end block on the eyewires.

SUMMARY OF THE INVENTION

It has now been found that the foregoing and related objects may be readily attained in a spectacle frame which has a nose bar, a pair of eyewires each having one side connected to the ends of the nose bar and end pieces on the other side, and a pair of temples pivotally connected to the end pieces on the eyewires. Either or both of the nose bar and each of the pair of temples include at least three links having interengaged end portions.

Desirably, the links are elongated along the elongated axis of the component, and a first link has a pair of centrally spaced arms at one end and a vertically disposed arm at the other end. A second link has a pair of vertically spaced arms at one end receiving the centrally disposed arm of the first link, and a third link has a centrally disposed arm at one end received between the pair of arms on the first link. The links also include means to effect interengagement thereof to prevent inadvertent disassembly. The interengaging means comprise threaded fasteners or pins extending through the arms of the links, or portions of the links may be deformed to provide a press fit.

The interengaged end portions may have abutting surfaces to preclude articulation therebetween, or the opposed surfaces may be configured so that one or more of the links may be free to pivot about the link with which it is engaged. Usually, the arms and recesses defined by the arms of the links have planar faces and the opposed surfaces are closely spaced to preclude relative pivotal movement.

In a preferred embodiment, each of the temples includes links and an end link is pivotally connected to the end pieces on the eyewires. Desirably, the pivotally connected link has a vertically extending recess at its pivoted end and a spring loaded pivot pin assembly is seated therein and engaged with a projecting portion on the end piece. The pivot pin assembly comprises a tubular shell, a pivot pin extending in the shell and rotatable therewithin, and a spring disposed about the pin and engaged with the shell and the pin. As a result, rotation in one direction of the pin within the shell as a result of pivoting of the pin during relative motion of the temple and eyewire end piece produces tensioning of the spring and a biasing pressure in the other direction to permit the temple to be pivoted outwardly from its normal position. The shell has an aperture therein seating a radially projecting arm on the spring intermediate its length to permit limited rotational movement therein to permit the temple to move between its folded position and its normal wearing position. The spring assembly desirably also includes end plates seated in the ends of the shell and through which the pin extends, and the spring has end portions seated in the plates.

In most instances, the temples comprise links adjacent the eyepieces and elongated ear loops extend from the end of the links spaced from the eyewires.

In one embodiment, the nose bar is comprised of links and the end links provide the connections to the eyewires. The surfaces of the links about the arms thereof are configured to orient the links in a fixed angular position.

When the nose bar and eyewires are fabricated from dissimilar metals, the nose bar seats mounting bars in the ends thereof, and the mounting bars are formed of substantially the same metallic composition as the eyewires and bonded thereto. The eyewires comprise loops with opposed ends which are bonded to the mounting bars and the inserts are fastened to the nose bar by threaded fasteners. Desirably, the nose bar has recesses seating the mounting bars.

The frame may additionally include a brow bar extending above the nose bar and secured to the eyewires. To do so, each of the eyewires has a boss at the upper end thereof with a bore extending therethrough, and the brow bar has threaded end portions extending into one end of the bores. Threaded elements Are seated in the opposite end of the bores of the eyewire bosses and threadably engage the threaded end portions to the brow bar.

BRIEF DESCRIPTION OF THE DRAWINGS

FIG. 4 is a fragmentary and partially exploded view of the temple and end piece construction in the spectacle frame of FIG. 1;

FIG. 5 is a fragmentary sectional view along the line 5—5 of FIG. 6;

FIG. 6 is a fragmentary sectional view along the line 6—6 of FIG. 5;

FIG. 13 is a front elevational view of an alternate link construction;

FIG. 14 is a top plan view of the links in FIG. 13;

FIGS. 14a–14c comprise top plan views of the links in FIGS. 13 and 14;

FIG. 15 is a plan view of modified construction of the links shown in FIGS. 13 and 14 for use as the nose bar in the spectacle frame of FIG. 1;

FIG. 16 is a front elevational view thereof with the elements partially disassembled;

DETAILED DESCRIPTION OF THE PREFERRED EMBODIMENT

Figure 1:
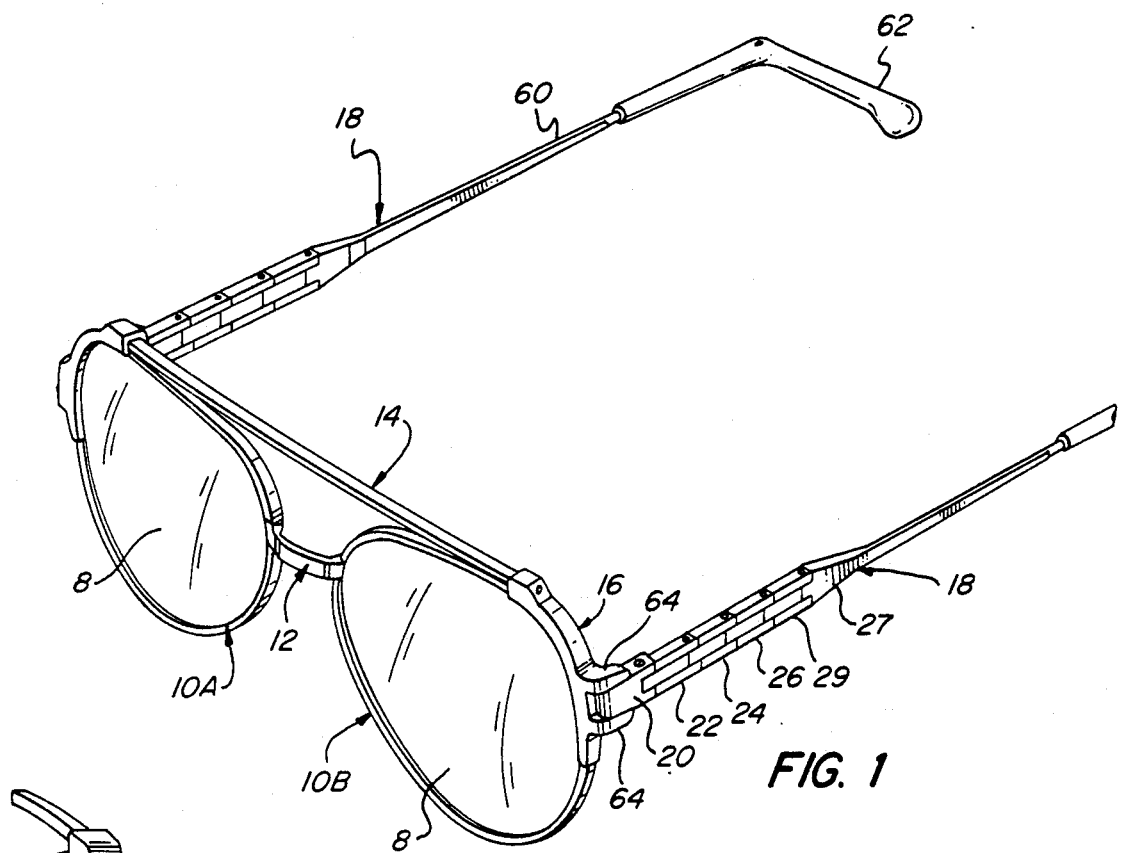
FIG. 1 is a perspective view of a spectacle frame embodying the present invention.

Turning first to FIG. 1, therein illustrated is a spectacle frame embodying various elements of the present invention. The frame is comprised of a pair of eyewires 10A, 10B joined together by a nose bar generally designated by the numeral 12, and a brow bar generally designated by the numeral 14. End pieces generally designated by the numeral 16 are disposed on the top outer sides of the eyewires 10, and a pair of elongated temples generally designated by the numeral 18 are pivotally mounted in the end pieces 16. Retained within the eyewires 10 are the lenses 8.

Figure 2:
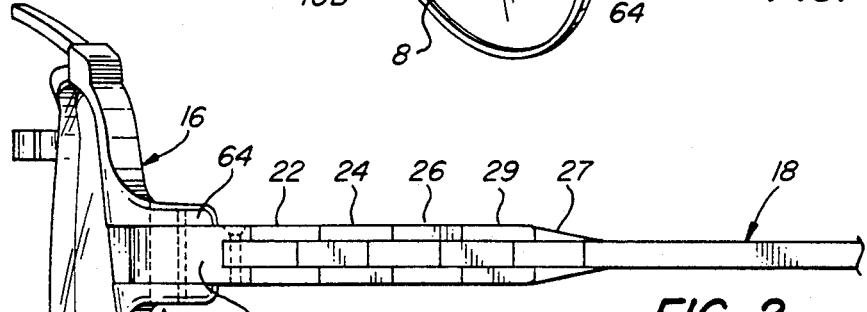
FIG. 2 is a fragmentary side elevational view thereof drawn to a greatly enlarged scale and with the spring pivot assembly shown removed from its seated position.
Figure 3:
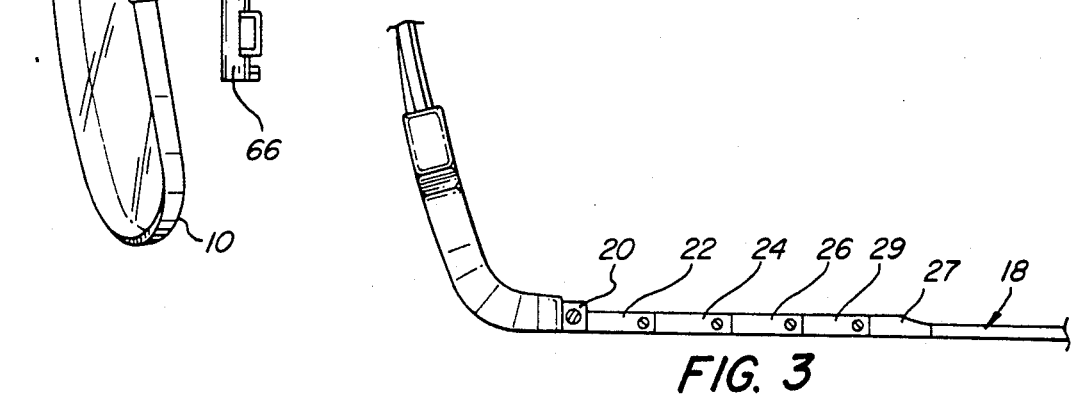
FIG. 3 is a fragmentary top elevational view of the assembly seen in FIG. 2.

Turning in detail first to the temples 18, the construction thereof is illustrated in detail in FIGS. 2–4. The forward portion of the temple 18 is comprises of a series of links generally designated by the numerals 20, 22, 24, 26, 27, and 29 which have interfitting end portions. As can be seen, the forward link 20 has a key-shaped bore or aperture 28 extending vertically through its forward end and a pair of vertically spaced arms 30 at its rearward end having apertures 32 extending therethrough. The adjacent link 22 has an arm 34 at its forward end which seats between the arms 30 of the link 20 and which has an aperture 36 extending therethrough which is axially aligned with the aperture 32 in the link 20. To assemble these links together, a threaded fastener 38 extends through the apertures 32 and 36 and threadably engages in the threaded lower aperture 32.

At its rearward end, the link 22 has a pair of vertically spaced arms 40 with apertures 42 therein, and the link 24 has an arm 44 with an aperture 46 at its forward end, and it seats between the arms 40 of the link 22 and is secured in assembly therewith by the threaded fastener 48.

At its rearward end, the link 24 has a pair of vertically spaced arms 50 having apertures 52 therein and between which seats the arm (not shown in FIG. 4) of the next link 29. At the forward end of the link 27 is an arm 54 which will seat between the arms of its adjacent link 29 (not shown in FIG. 4). The fastener 58 will seat in the aperture 56 to secure it in assembly. In this particular construction, it can be seen that the opposing faces of the links 22, 24 and 27 are essentially planar and that their interfitting arms are dimensioned so that their faces fit snugly together to essentially preclude any relative rotational motion about the fasteners which assembly them. However, the cooperating ends of the links 20 and 22 are configured to allow the link 22 to pivot about the fastener 38.

The rearward link 27 has an elongate shank portion 60 which seats thereon the plastic ear loop 62. The forward link 20 at its forward end is slidably and pivotally seated between the arms 64 of the end piece 16 and the pivotal connection is provided by the spring pivot assembly generally designated by the numeral 66.

As seen in FIGS. 4 and 5, the upper arm 64 has a key shaped recess 68 extending inwardly from its lower surface and the lower arm 64 has a key shaped aperture 70 extending therethrough. The spring pivot assembly 66 seats in the aperture 70 of the lower arm 64, the aperture 28 of the link 20 and the recess 68 of the upper arm 64.

Figure 7:
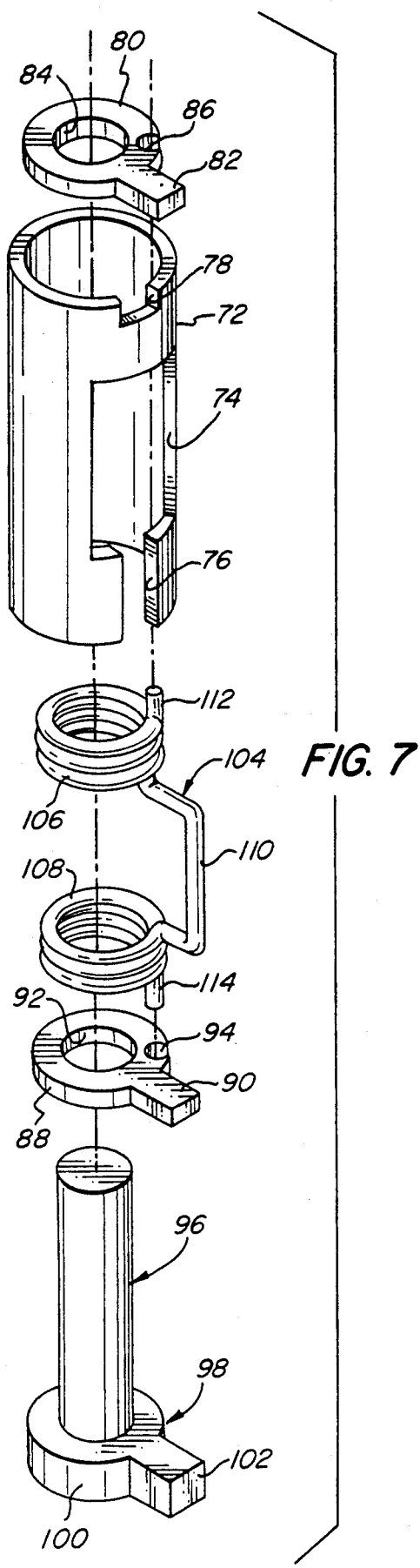
FIG. 7 is an exploded view of the spring pivot assembly.

As best seen in FIG. 7, the spring pivot assembly 66 includes a tubular sleeve 72 which has a relatively large cutout 74 intermediate its length and a slot or passage 76 extending to the cutout 74 from its lower end. At its upper end, the tubular member 72 has a notch 78 which receives the projecting arm 82 on the top plate 80 which seats in the upper end of the sleeve 72. A central aperture 84 is provided in the top plate 80 as is a small aperture 86 adjacent its circumference. A bottom plate 88 is similarly configured with an arm 90, central aperture 92 and small aperture 94, and its arm 90 will seat in the slot 76.

Extending upwardly in the tubular sleeve 72 is the shank 96 of the mounting pin generally designated by the numeral 98. The outer diameter of the shank 96 is smaller than the inner diameter of the tubular sleeve 72 so as to provide radial spacing therebetween. At its lower end, the pin 98 is provided with a base 100 which has a diameter substantially equal to the inner diameter of the tubular sleeve 72 and it has an arm 102 which will also seat in the slot 76.

Disposed about the shank 96 of the pin 98 is the torsion spring generally designated by the numeral 104 having a pair of vertically spaced coiled portions 106, 108 connected by the radially outwardly extending U-shaped arm portion 110. The ends 112, 114 of the spring 104 seat in the small apertures 86, 94 of the plates 80, 88.

As can be seen in FIGS. 5 and 6, the U-shaped arm portion 110 extends through the cutout 74 in the tubular sleeve 72 and relative rotation of the tubular sleeve 72 relative to the arm portion 110 may thereby occur over the arcuate distance defined thereby, as indicated in FIG. 6 in phantom line. As also seen in FIGS. 5 and 6, the U-shaped arm portion 110 and the arms 82, 90 and 102 extend into the wing portions of the T-shaped apertures and recess 28, 70 and 68 respectively.

Figure 9:
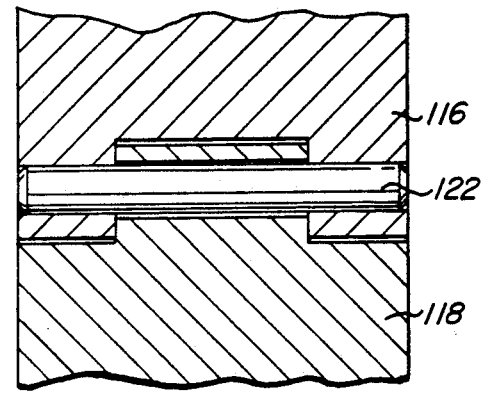
FIG. 9 is a similar view showing the pin after severing and linking.
Figure 8:
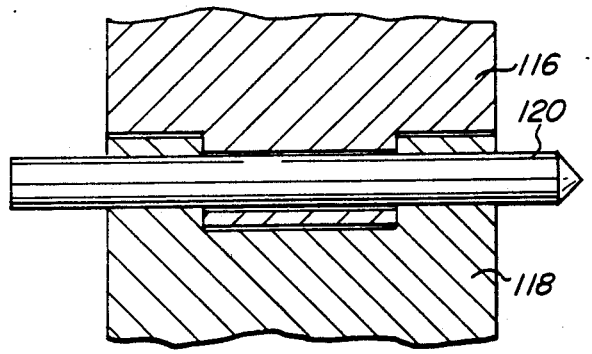
FIG. 8 is an enlarged sectional view of the juncture between a pair of links in the temple showing a wire pin being inserted as a fastener.

Turning now to FIGS. 8 and 9, therein illustrated is another embodiment of fastener for securing links in assembly. Wire stock 120 is inserted into aligned apertures in the arms of the limbs 116, 118, and it is struck after insertion to expand it and sever the ends to provide locking pins 122 in the assembly seen in FIG. 9.

Figure 10:
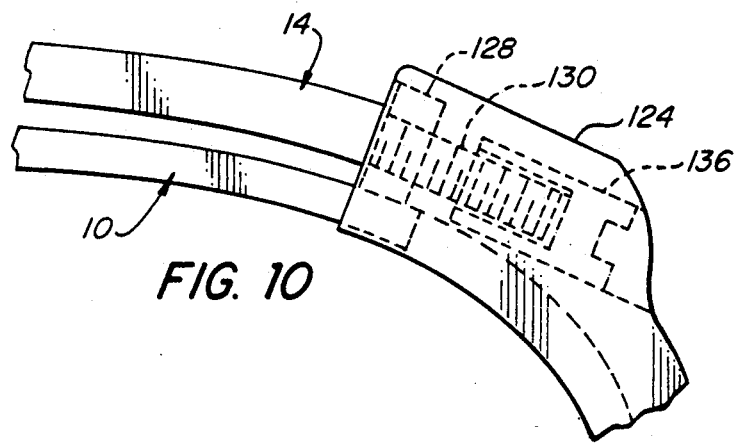
FIG. 10 is an enlarged fragmentary elevational view showing the seating of the brow bar in the end piece.
Figure 11:
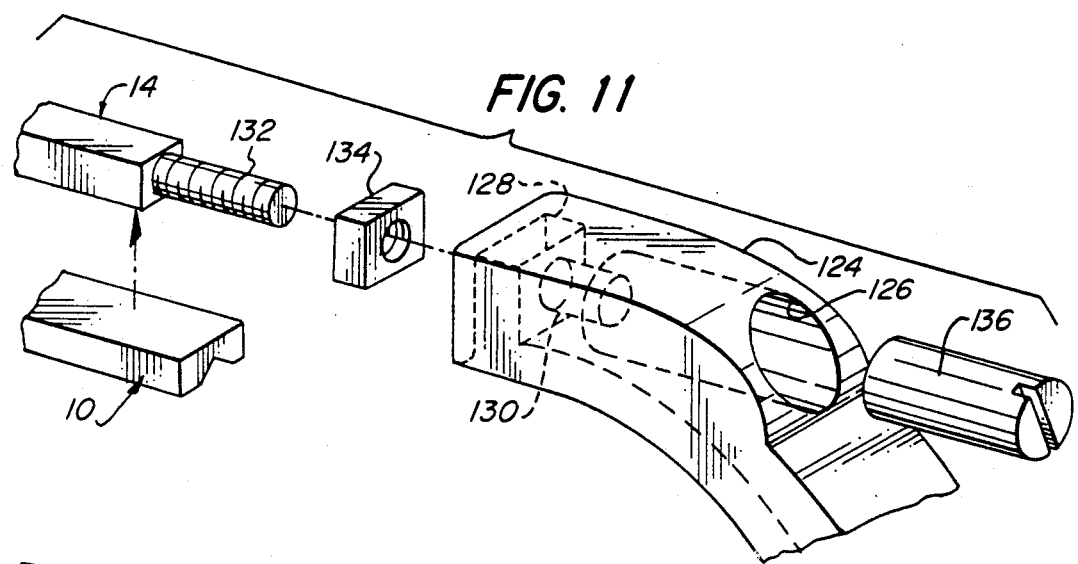
FIG. 11 is a fragmentary exploded view thereof.
Figure 12:
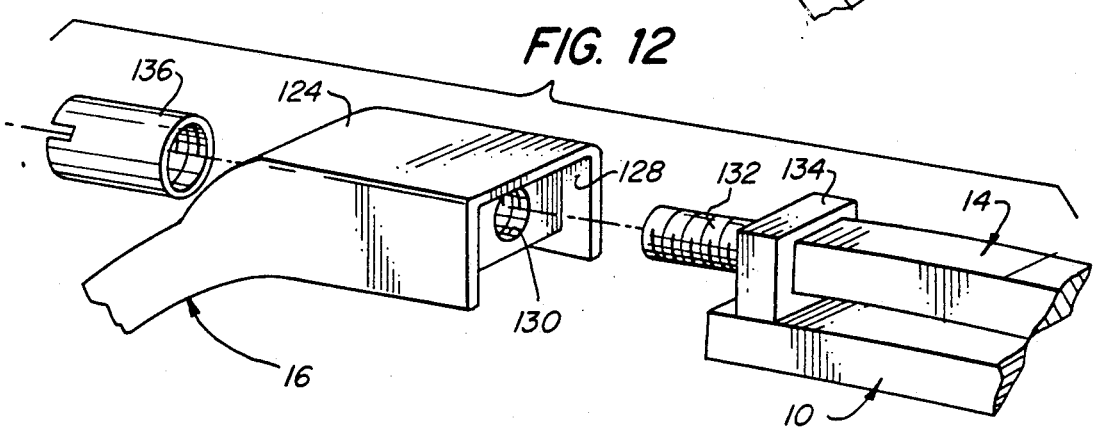
FIG. 12 is a similar view of the opposite side of the brow bar.
Figure 17:
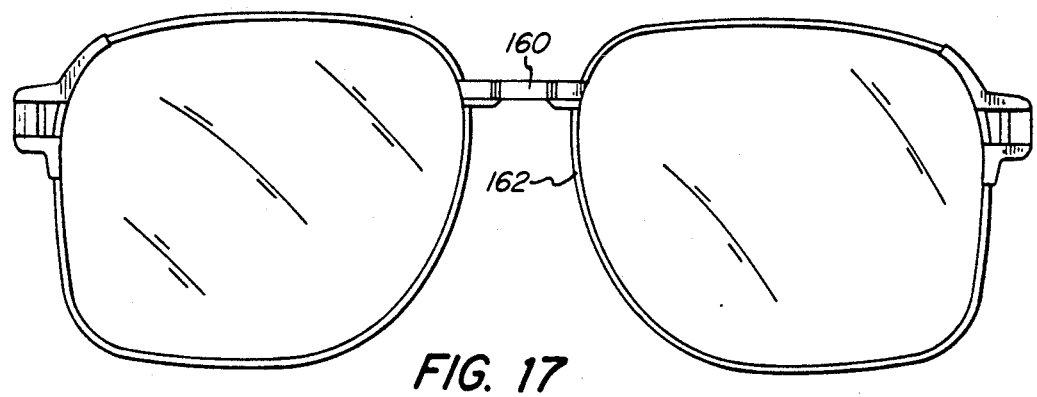
FIG. 17 is a front elevational view of a spectacle frame employing a construction enabling the use of dissimilar metals for the nose bar and the eyewires.
Figure 18:
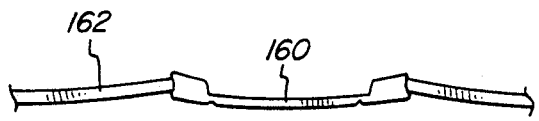
FIG. 18 is a fragmentary top elevational view of the nose bar and eyewires thereof.
Figure 19:
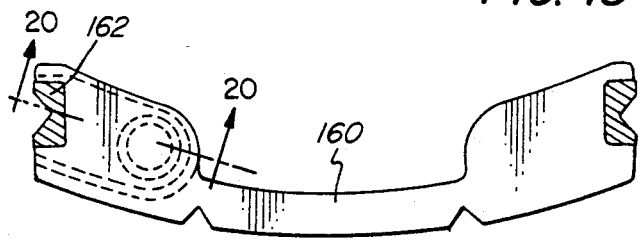
FIG. 19 is a fragmentary top elevational view thereof drawn to a greatly enlarged scale.

Turning next to FIGS. 10–12, therein illustrated is a construction for providing a bridge for the ends of the eyewires 10 and for providing the end piece 16 to assemble the temples thereto and to secure a brow bar 14 of dissimilar metallic construction. The end piece 16 has a boss 124 at its upper end, and it has a passage extending therethrough with a relatively large diameter portion 126 adjacent its outer end, a rectangular recess 128 at its inner end, and a small diameter bore 130 extending therebetween.

Each end of the brow bar 14 is provided with a threaded shank 132 which extends through the nut 134 seated in the recess 128 and it continues on through the small diameter bore 130 into the large diameter bore 126. An internally threaded cylindrical fastener 136 is seated in the large diameter bore 126, and rotation of the fastener 136 about the threaded shank 132 draws the brow bar 14 through the nut 4 tightly and securely into the boss 124 of the end piece 16 to secure it in assembly. Also seen is a fragmentary portion of the eyewire 10 which is received within a groove in the end piece 16.

Turning next to FIGS. 13–14, another configuration of link construction is therein illustrated. Here, the links 138, 140 and 142 are formed with the interfitting arms 144, 146 intermediate their vertical height and the adjacent surfaces are contoured to permit orientation of the several links at angular positions rather than in a rectilinear orientation. The arms and the recesses in which they are received have an arcuate configuration, and the opposed surface of the links thereabove and therebelow, are cooperatively configured to permit relative pivoting. The arms 144, 146 are trapped in the arcuate recesses by deforming the metal thereabout. A screw or other means can be utilized to prevent vertical displacement once assembled.

In FIGS. 15 and 16, the limited articulation concept is shown as employed in the nose bar 4 of the spectacle frame of FIG. 1. In this instance, the two end links 148 and 152 mesh with the outer link 150 and have generally V-shaped grooves 154 in their outer ends to seat the eyewire 10 therewithin and to permit firm bonding to the eyewire by soldering or the like. Limited articulation is provided by the arcuate configuration and tapering of the surfaces about the arms 156 and recesses 158 so as to permit the assembly to fit comfortably upon the nose of the wearer.

Figure 20:
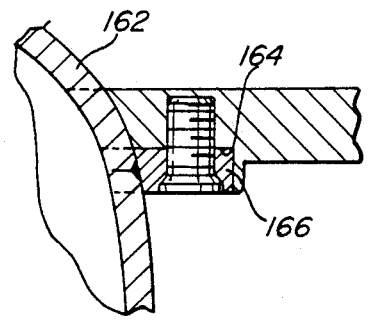
FIG. 20 is a fragmentary sectional view along the line 20—20 of FIG. 19.
Figure 21:
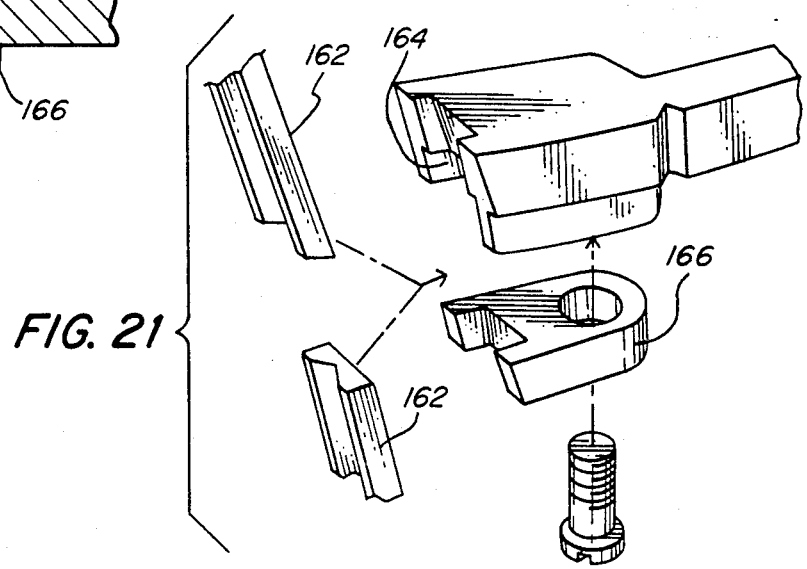
FIG. 21 is a partially exploded view of the eyewire and nose bar assembly seen in FIGS. 17–20.

Turning next to FIGS. 17–21, therein illustrated is an assembly for effecting bonding of components of dissimilar metallic alloys. In this instance, the nose bar 160 is of a first metallic alloy, and the eyewires 162 are of a distinct metallic alloy which will not normally bond firmly thereto. As seen in FIGS. 20 and 21, the ends of the nose bar 160 are provided with recesses 164 in which are seated inserts 166 of substantially the same alloy, or an alloy compatible with, the alloy employed for the eyewires 162 A threaded fastener 168 extends through the insert 166 and into the nose bar 160 to mechanically assemble and secure the insert 166 thereto. The ends of the eyewire 162 extend in the groove formed in the end of the nose bar 160 and abut in its insert 166, and they are soldered to the insert 166 to effect a secure assembly between the eyewires 162 and the nose bar 160.

It will be readily appreciated that the use of the links enables facile variation and dimensioning of the various elements of the spectacle frame. For example, merely varying the number of links allows adjustment of length and change in appearance of the temples by permitting the reduction in the straight shank to the ear loop. Different sizer links and links of different configuration may be combined in a single assembly to vary appearance and to vary dimension. Moreover, the links can be of varying color to provide for varying appearance.

The links may be secured in assembly by threaded fasteners as shown in one illustrated embodiment, or by pins which are headed or expanded as described with respect to another illustrated embodiment, or by rolling over the metal about the interfitting arm portions in grooves as described with respect to another one of the embodiments. Moreover, locking pins or the like may be secured against axial movement in the aligned apertures by set screws which extend perpendicularly thereto.

The links are preferably fabricated from metal although they may also be fabricated from synthetic resins. The links may be configured so that they lock together when assembled and there is no articulation therebetween, or the end portions may be configured so as to permit limited articulation, or even a substantial degree of articulation.

A particularly advantageous arrangement for the temples is that illustrated in the drawings wherein the first link not only provides a spring pivot assembly with respect to the end piece to permit limited pivotal movement of the temples outwardly beyond the normal wearing position. This link also seats a pivot pin for the next link so that the temples folds about the rear end of this link rather than about the forward end of the link which is engaged in the end piece. Thus, the temples will fold about the end of the link for storage purposes.

By use of metallic inserts mechanically secured to brow bars and nose bars, eyewires of incompatable alloys may be secured to such bars in a simple and efficient manner. The technique of providing the brow bars with threaded ends which threadably engaged in bosses in the end pieces also permits the use of dissimilar alloys for these components.

It will be readily appreciated that the actual configuration and variations in the structure of the components may vary from those which have been specifically illustrated and described without parting from the spirit of the invention. The components may be readily fabricated in a manner which is reasonably economical by conventional stamping, casting or molding techniques depending upon the nature of the materials employed, and they may be assembled readily to provide a relatively strong and long lived structure.

Thus, it can be seen from the foregoing detailed description and attached drawings that the present invention does provide a spectacle frame construction which is capable of substantial variation in appearance while still permitting facile assembly of the components. These components may be readily and relatively economically fabricated and may be utilized so as to accommodate variations in size desired for the frame. The frame permits easy assembly of dissimilar metals utilized for different components, and the preferred construction provides a highly desirable spring action for the temples.

Having thus described the invention, what is claimed is:

1. In a spectacle frame, the combination of components comprising:
   (a) a nose bar having two opposite ends;
   (b) a pair of end pieces;
   (c) a pair of eyewires each having one side connected to one end of said nose bar and to one of said end pieces on the other side; and
   (d) a pair of temples pivotally connected to said end pieces of said eyewires, at least one of said nose bar and said pair of temples including at least three links having interengaged end portions, said links being elongated along an elongated axis of the component in which they are disposed, a first one of said links having a pair of vertically spaced arms at one end and a centrally disposed arm at the other end, a second of said links having a pair of vertically spaced arms at one end receiving said centrally disposed arm of said first link, and a third one of said links having a centrally disposed arm at one end received between said pair of vertically spaced arms on said first link, and wherein said links including means effecting interengagement thereof to prevent inadvertent disassembly, and at least two adjacent links having abutting surfaces configured to preclude articulation therebetween.

2. The spectacle frame in accordance with claim 1 wherein said interengaging means comprise threaded fasteners extending through the interfitting arms of said links.

3. The spectacle frame in accordance with claim 1 wherein said interengaging means comprise pins extending through the arms of said links.

4. The spectacle frame in accordance with claim 1 wherein said interengaging means comprise deformed portions of said links.

5. The spectacle frame in accordance with claim 1 wherein the adjacent surfaces of said links are configured so that at least one of said links is free to pivot about the link with which it is engaged.

6. The spectacle frame in accordance with claim 1 wherein the centrally arms disposed and the vertically arms disposed of said links have adjacent planar surfaces which are closely spaced to preclude relative pivotal movement.

7. The spectacle frame in accordance with claim 1 wherein each of said temples includes said links and an end link is pivotally connected to said end pieces on the eyewires.

8. The spectacle frame in accordance with claim 1 wherein said temples comprise a multiplicity of interconnected links adjacent said eyepieces and elongated ear loops extending from an end of said links spaced from said eyewires.

9. In a spectacle frame, a pair of temples including at least three links having interengaged end portions and ear loops connected to one of an end links, said links being elongated along an elongated axis of said temples, a first one of said links having a pair of vertically spaced arms at one end and a centrally disposed arm at the other end, a second one of said links having a pair of vertically spaced arms at one end receiving said centrally disposed arm of said first link, and a third one of said links having a centrally disposed arm at one end received between said pair of vertically spaced arms on said first link, said links including means effecting interengagement thereof to prevent inadvertent disassembly, the interengaged ends of at least two of said links having abutting surfaces configured to preclude articulation therebetween.

10. The spectacle frame in accordance with claim 9 wherein said interengaging means comprise threaded fasteners extending through the interfitting arms of said links.

11. The spectacle frame in accordance with claim 9 wherein said interengaging means comprise pins extending through the arms of said links.

12. The spectacle frame in accordance with claim 9 wherein the centrally arms disposed and the vertically arms disposed of said links have adjacent planar surfaces which are closely spaced to preclude relative pivotal movement.

13. In a spectacle frame, the combination of components comprising:
   (a) a nose bar having two opposite ends;
   (b) a pair of end pieces;
   (c) a pair of eyewires each having one side connected to one end of said nose bar and to one of said end pieces on the other side; and
   (d) a pair of temples pivotally connected to said end pieces of said eyewires, and each one of said pair of temples including a multiplicity of interconnected links pivotally connected to one of said end pieces said links being elongated along an elongated axis of the component in which they are disposed, a first one of said links having a pair of vertically spaced arms at one end and a centrally disposed arm at the other end, a second one of said links having a pair of vertically spaced arms at one end receiving said centrally disposed arm of said first link, and a third one of said links having a centrally disposed arm at one end received between said pair of vertically spaced arms on said first link, said links including means effecting interengagement thereof to prevent inadvertent disassembly, and at least two adjacent links having abutting surfaces configured to preclude articulation therebetween.

* * * * *

UNITED STATES PATENT AND TRADEMARK OFFICE
CERTIFICATE OF CORRECTION

PATENT NO. : 5,258,784
DATED : November 2, 1993
INVENTOR(S) : Ian J. Baines

It is certified that error appears in the above-indentified patent and that said Letters Patent is hereby corrected as shown below:

Column 7, line 53, after "adjacent" please add --end--.

Signed and Sealed this

Twenty-sixth Day of April, 1994

*Attest:*

BRUCE LEHMAN

*Attesting Officer*     *Commissioner of Patents and Trademarks*